United States Patent
Immordino et al.

(10) Patent No.: US 6,379,458 B1
(45) Date of Patent: Apr. 30, 2002

(54) EFFICIENT SET ACCELERATOR FOR PLASTER

(75) Inventors: Salvatore C. Immordino, Trevor, WI (US); Therese Espinoza, Wood Dale, IL (US); Richard B. Stevens, Crystal Lake, IL (US); Charles J. Miller, McHenry, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 09/502,609

(22) Filed: Feb. 11, 2000

(51) Int. Cl.⁷ ............................................. C04B 11/00
(52) U.S. Cl. .................... 106/772; 106/783; 106/785; 106/786; 106/819
(58) Field of Search ................................. 106/772, 783, 106/785, 786, 819

(56) References Cited

U.S. PATENT DOCUMENTS

| | | | |
|---|---|---|---|
| 2,216,555 A | 10/1940 | King et al. | |
| 3,573,947 A | 4/1971 | Kinkade et al. | |
| 3,592,670 A | 7/1971 | Kossuth et al. | |
| 3,870,538 A | 3/1975 | Burkard et al. | |
| 3,984,269 A | 10/1976 | Schneller et al. | |
| 4,117,070 A | 9/1978 | O'Neill | |
| 4,201,595 A | 5/1980 | O'Neill | |
| 4,288,338 A | 9/1981 | Phillips | |
| 4,443,261 A | 4/1984 | Nordqvist | |
| 4,470,877 A | 9/1984 | Johnstone et al. | |
| 4,488,327 A | 12/1984 | Snider | |
| 4,548,676 A | 10/1985 | Johnstone et al. | |
| 4,681,644 A | 7/1987 | Dozsa | |
| 4,853,085 A | 8/1989 | Johnstone et al. | |
| 5,041,333 A | 8/1991 | Conroy | |
| 5,709,743 A | 1/1998 | Leture et al. | |
| 5,746,822 A | 5/1998 | Espinoza et al. | |

OTHER PUBLICATIONS

*Rock Products*, Oct., 1954 "Effect of Some Inorganic Compounds on the Solubility Setting and Tensile Strength of Calcined Gypsum" Wallace C. Riddell.

Jan. 1959 "Acceleration of the Set of Gypsum Plaster" M.J. Ridge.

*United States Department of the Interior*, 1959, "Hydration–Rate Studies of Gypsum Plasters: Effects of Small Amounts of Dissolved Substances" J.P. Coughlin, K.C. Conway, M.F. Koehler, and D.F. Barry. No Month.

*Primary Examiner*—Elizabeth D. Wood
(74) *Attorney, Agent, or Firm*—Greer, Burns & Crain, Ltd.; John M. Lorenzen; David F. Janci

(57) ABSTRACT

A set accelerator for at least one of accelerating the hydration rate and reducing the set time of an aqueous slurry of calcium sulfate hemihydrate is described. The set accelerator consists of a mixture of ground calcium sulfate dihydrate and zinc sulfate material. Aluminum sulfate material is an optional component of the set accelerator. The set accelerator is particularly useful in accelerating the hydration rates of sprayable plasters. A fluid form of the set accelerator may be made by suspending the solids in water. The fluid form is advantageously used in ready mixed setting type joint compounds.

21 Claims, 1 Drawing Sheet

EFFICIENT SET ACCELERATOR FOR PLASTER

BACKGROUND OF THE INVENTION

This application relates to set accelerators for accelerating the hydration time of calcined gypsum. More specifically, it relates to a combination of calcium sulfate dihydrate and zinc sulfate as a gypsum set accelerator.

Gypsum, also known as set gypsum or calcium sulfate dihydrate, has long been a large volume commercial article of commerce in the building trades. Gypsum articles, including gypsum boards, molds, walls and the like, are prepared from an aqueous slurry of calcium sulfate hemihydrate. Calcium sulfate hemihydrate is also known as calcined gypsum, calcium sulfate semihydrate, calcium sulfate half-hydrate, stucco or plaster of paris. As the plaster hydrates, water reacts with calcium sulfate hemihydrate to form an interlocking matrix of calcium sulfate dihydrate crystals. Excess water must be purged, dried or allowed to evaporate from the gypsum-based product. The setting time of the slurry depends on a number of factors, including the age of the calcined gypsum, impurities in the calcined gypsum, surface area, pH, particle size and the temperature at the time of mixing.

Plasters are useful in a number of commercial applications. Molds are made of plaster for the manufacture of ceramic articles, such as crockery, dishes and bathroom fixtures. Plasters are also used for pottery, oil well cement, agricultural and general industrial uses. Plasters are also used for coating gypsum wallboard on interior walls where a plaster surface is desired, for example, to impart a textured surface. In addition, plaster is also used for setting-type joint compounds to treat the seams of drywall panels. Plaster mixtures, which form a machinable composition, are useful in creating industrial models or complex patterns on decorative columns or panels. In addition, plaster compositions are also used in the manufacture of wallboard, ceiling tiles and building fire blocks.

Where plaster compositions are utilized in all of the above applications, it is important to closely monitor and/or control the rate of hydration, which directly relates to when the plaster starts to set. Most all plaster uses require that the hydration rate, or set time, be controlled to a degree that allows for the efficient use of the plaster before it begins to set. Hydration rate and set time vary with each plaster composition. In the instance of a sprayable plaster, a spray apparatus employed to distribute the plaster slurry will often become clogged with solidifying calcium sulfate dihydrate crystals if the slurry sets more quickly than expected. Conversely, compositions, which set too slowly, may lose a desired form before they harden sufficiently to hold a shape. Thus, sprayable plaster compositions should ideally not set until they are emitted from the spray apparatus, but once sprayed, they should set quickly to retain the desired shape.

Accelerators for increasing the hydration rate, and for reducing the setting time of calcined gypsum, are well known in the art. The most common accelerator is calcium sulfate dihydrate that has been finely ground. When freshly prepared, it has high potency. However, when stored prior to use, it loses its effectiveness. U.S. Pat. No. 2,078,198, herein incorporated by reference, discloses improved accelerators comprising calcium sulfate dehydrate intermixed with sugar. This mixture renders the calcium sulfate dihydrate less subject to deterioration by aging.

Heating the co-ground sugar and calcium sulfate dihydrate mixture so that caramelized sugar forms a coating on the calcium sulfate dihydrate is disclosed in U.S. Pat. No. 3,573,947, herein incorporated by reference. The melted sugar coating further stabilizes the calcium sulfate dihydrate, reducing the effects of aging to a greater degree than the unheated sugar/dihydrate mixture. However, there is a limit to the amount of calcium sulfate dihydrate solids that can be added to a sprayable mixture for achieving an accelerated set. Once this upper concentration limit is reached, the concentration of the calcium sulfate dihydrate solids has not provided satisfactorily low set times, and also has been too viscous to pump through a spray applicator apparatus.

Zinc sulfate is used as an accelerator for ready-mixed setting type joint compound described in U.S. Pat. No. 5,746,822, which is herein incorporated by reference. No combination of zinc sulfate and calcium sulfate dihydrate solids used as an accelerator is contemplated in this reference. Also, zinc sulfate alone is not a sufficiently powerful accelerator for obtaining hydration rates and set times required for a sprayable plaster.

Aluminum sulfate is also known as an accelerator for reducing the set time of other plaster compositions. U.S. Pat. No. 3,984,269 discloses spraying an aluminum sulfate accelerator solution on the tape or at the joint of the seams in gypsum wallboard. When the accelerator comes into contact with the calcium sulfate hemihydrate composition, it expedites the setting reaction.

Aluminum sulfate hydrate has also been disclosed for use as an accelerator in U.S. Pat. No. 4,681,644, which is hereby incorporated by reference. The patent suggests the manufacture of gypsum board using an accelerator with multiple coatings. The accelerator is prepared by first coating freshly ground calcium sulfate dihydrate with sugar. Thereafter about 10–40% by weight of aluminum sulfate hydrate is ground with the sugar-coated dihydrate, based upon the weight of the total accelerator composition.

However, a disadvantage of the use of aluminum sulfate hydrate in accelerator compositions is that solutions of it in water are relatively corrosive, having a pH of approximately 1.0–1.7 (for 50% solutions). It has also been noted that in mixtures of aluminum sulfate and calcium sulfate dihydrate solids, at higher concentrations of aluminum sulfate, the aluminum sulfate does not uniformly disperse in the slurry, and migrates to the surface of the setting composition. This leaves an undesirable residue on the surface.

Yet another disadvantage of aluminum sulfate in accelerator compositions is that, when introduced into setting type joint compounds, it can cause undesirable foaming by reaction with calcium carbonate. In some applications, accelerator compositions including aluminum sulfate have resulted in set plaster having reduced strength.

It is an object of this invention to provide an improved set accelerator for at least one of accelerating the hydration rate and reducing the set time of plaster compositions in a predictable fashion.

It is another object of this invention to provide an improved set accelerator to accelerate the hydration rate of a tool or spray applied plaster without reducing the sprayability of the plaster slurry and/or the machinability of the set plaster composition.

It is yet another object of this invention to provide an improved in fluid form that is easily incorporated into the plaster slurry to accelerate the hydration rate of plaster mixtures and which has a relatively neutral pH.

BRIEF SUMMARY OF THE INVENTION

The above-listed objects are met or exceeded by the present set accelerator for plaster which features a combination of calcium sulfate dihydrate and zinc sulfate material, which, when introduced into a slurry of calcium sulfate hemihydrate and water, causes it to have a relatively rapid hydration rate and/or set time, and to set rapidly and predictably.

More specifically, the present invention provides a set accelerator comprising a mixture of ground calcium sulfate dihydrate and zinc sulfate material for at least one of accelerating the hydration rate and reducing the set time of an aqueous slurry of calcium sulfate hemihydrate. Aluminum sulfate material may optimally be added when set times sufficient for sprayable plasters are required. A liquid set accelerator solution may be formed by the addition of water.

The present invention is useful for increasing or accelerating the hydration rate of a plaster composition. The set accelerator is particularly useful in sprayable plasters, where control of the hydration reaction is very important. Set times may be determined with great accuracy when the accelerator composition of the present invention is used. Prior to introduction of the present set accelerator, the hydration of the plaster composition to be sprayed proceeds slowly enough to prevent solids formation in the spray apparatus. The set accelerator is also able to accelerate hydration so that the plaster composition will hold its shape on a vertical surface without running or dripping. The accelerator of the present invention is able to control the hydration to achieve this balance. Optional coatings on the dihydrate may be used to maintain its activity over long periods of time.

Further, the set accelerator acts in such a way that it does not adversely affect the properties of the plaster, such as sprayability or machinability. Machinable plaster compositions must be relatively hard so that designs can be carved into the plaster or it can be precisely shaped with power tools. Addition of the optional aluminum sulfate hydrate material accelerates the hydration rate, and the set of the plaster composition even further so that it is suitable for use on vertical surfaces with a sprayable composition. In particular, this liquid set accelerator composition, when used in the spray apparatus of the preferred embodiment, mixes easily with the plaster composition to form a sprayable plaster composition that sets up in minutes.

The present invention also finds use in generating an especially useful set accelerator for use in ready mixed setting type joint compound as described in U.S. Pat. No. 5,746,822. Such plaster compositions require the use of a set initiator (accelerator) with a log K value greater than that for calcium ion in order to initiate setting. A liquid set accelerator would be preferred among users for ease and speed of incorporation of the set accelerator into the ready mixed setting type joint compound. Zinc sulfate is a preferred powdered material for set initiation, but is not when premixed with water. The present invention provides for a fluid suspension of the set accelerator that will provide efficient set initiation and acceleration, in a fluid form that is less corrosive than alum or ferric sulfate liquid accelerator solutions, while not adversely affecting the mixing and finish properties of the setting type joint compound.

DETAILED DESCRIPTION OF THE INVENTION

Figure 1:
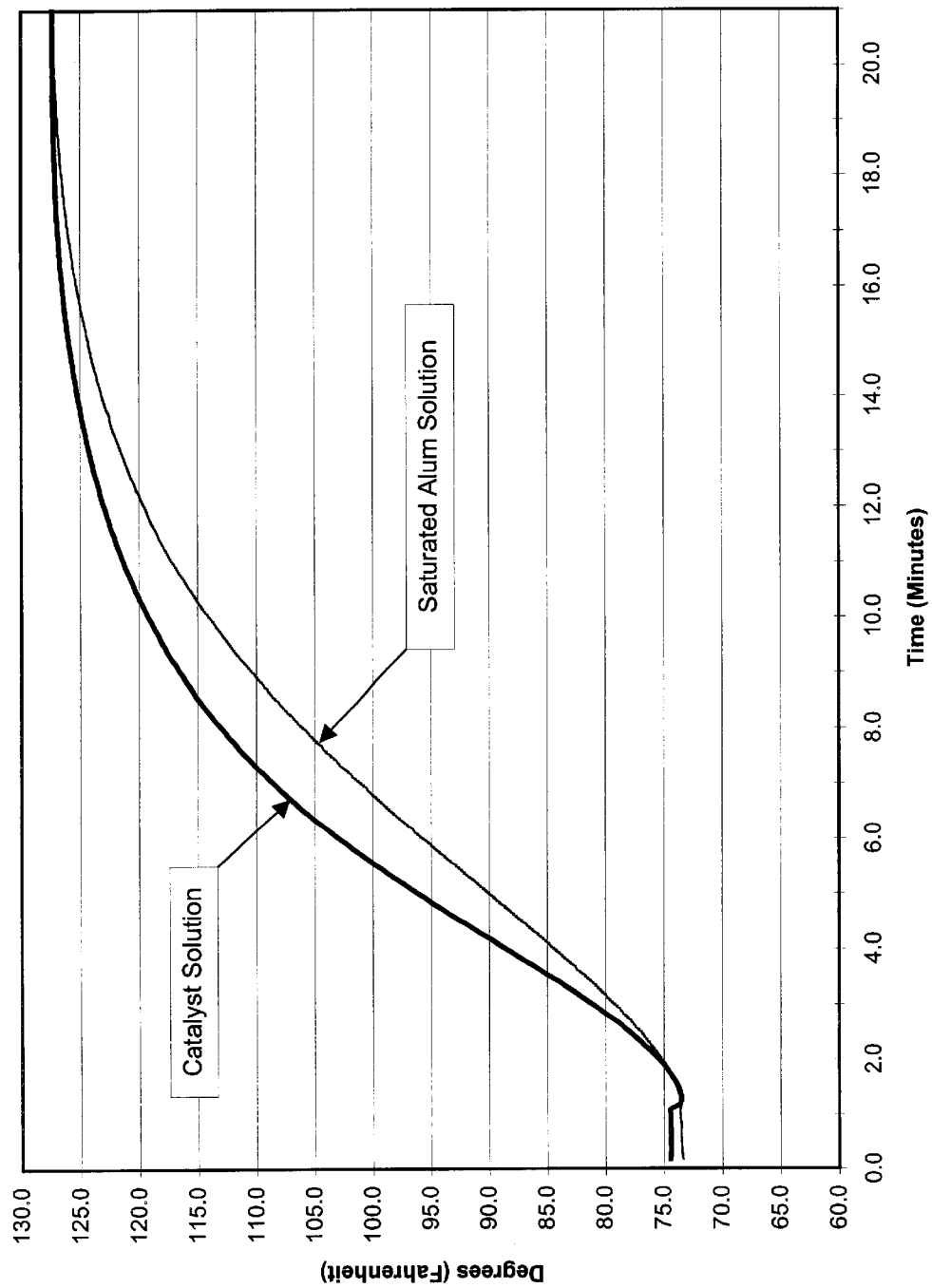
FIG. 1 is a graphical representation of a comparison of hydration rates over time for the present set accelerator compared with an alum set accelerator.

The present invention disclosed a set accelerator for at least one of accelerating the hydration rate and reducing the set time of a plaster composition, preferably an aqueous slurry composition, the set accelerator including a mixture of calcium sulfate dihydrate and zinc sulfate material. Dry set accelerator may be added directly to plaster compositions in amounts necessary to achieve the desired set time. A liquid form of the set accelerator may be made by the addition of water. Sprayable plasters utilize the liquid form of the set accelerator to mix more readily with the plaster slurry.

The calcium sulfate dihydrate used may be any natural or chemical gypsum dihydrate material of either high or low grade and of appropriate feed size for grinding. Freshly mined gypsum, such as high-grade landplaster, which is 80 or more weight % dihydrate, is particularly suitable. The dihydrate may contain impurities and inert materials without substantial detriment to its usage in the set accelerator, however, impurities that are known to be detrimental to the setting time of calcined gypsum, such as phosphoric acid, should be avoided or minimized. Dihydrate prepared from the hydration of calcium sulfate hemihydrate, such as scrap gypsum board, may also be suitable for use in the set accelerator. The amount of dihydrate used should be in the range of from about 20% to about 80% by weight based on the weight of the dry set accelerator.

If the gypsum accelerator is not to be used immediately after grinding, it is preferred that the dihydrate be treated with a coating agent to prevent it from becoming inactive over time. Any coating agent known in the art may be used that possesses certain properties. The coating agent must not retard the hydration rate or the set time of the calcium sulfate hemihydrate to which it is added. Physical properties of the product should also not be harmed by the coating agent. When the calcium sulfate hemihydrate with its additives are added to the mixer with water to form a slurry, the coating agent must dissolve away to expose the active sites of the highly fractured dihydrate crystals. Coating agents that are particularly suitable include starches, sugars, and boric acid or any combination of these compounds. The amount of coating agent present may range from about 5% to about 25% based on the weight of the calcium sulfate dihydrate feed stream.

When a coating agent is used, the dihydrate crystals and the coating agent may be ground together to achieve size reduction and also to promote intimate association between the coating agent and the dihydrate. Grinding of the materials may be done using any grinding apparatus known in the art. A preferred grinding apparatus is a ball mill. Preparation of ground mixtures of calcium sulfate dihydrate and coating agents are known in the art, particularly in U.S. Pat. No. 3,573,947 which is herein incorporated by reference.

In the most preferred embodiment, the coating may be melted over the surface of the dihydrate to maintain the activity of the ground dihydrate over long periods of time. Sugars, such as glucose, sucrose and dextrose are particularly preferred for this embodiment, although any sugar that melts sufficiently at temperatures under 270° F. may be used in the gypsum accelerator. The mixture may then optionally be heated to melt and caramelize the sugar, allowing it to coat the surface of the ground calcium sulfate dihydrate. This option is preferred if the gypsum accelerator must be stored for later use or shipped to another location.

The complete coating and caramelization of the sugar serves to seal up the surface of the gypsum particles, making them less susceptible to the effects of aging. The caramelized coating then completely dissolves when the additive is mixed with water in the product slurry, exposing the surface of the highly fractured dihydrate crystal. The dihydrate particles serve as "seed crystals," promoting crystal growth as the hemihydrate is hydrated to form an interlocking matrix of dihydrate crystals. Excellent accelerator activity is obtained by heating the coated dihydrate to 250° F., but the temperature may be as low as 175° F. Usually temperatures above about 270° F. should be avoided because they make it difficult to control the moisture content of the accelerator.

Zinc sulfate material is another required component of this set accelerator. This component is generally added in amounts of from 20% to about 80% by weight based on the weight of the dry set accelerator. All zinc sulfate derivatives are contemplated, including anhydrous and various hydrated forms, such as monohydrate and hexahydrate. The ratio of zinc sulfate to calcium sulfate dihydrate should be within the range of from about 4:1 to about 1:4, preferably from about 2:1 to about 1:2.

An optional additive to the set accelerator is aluminum sulfate hydrate, commonly called alum. Alum generally comprises the formula $Al_2(SO_4)_3 \cdot nH_2O$, where n is an integer from 6 to 18. Papermaker's alum or common alum, consisting mainly of higher hydrates where n ranges from 14–18, is preferred. Aluminum-potassium double salt may also be used. The amount of aluminum sulfate hydrate may be up to about 45% by weight, although amounts of from 20% to about 40% by weight are preferred. Use of greater amounts of alum decreases the set time of the plaster, however it also tends to lower the pH, thus increasing the corrosive properties of the composition.

The set accelerator may be blended as a dry mix of the above components. It is preferred that the calcium sulfate dihydrate and the zinc sulfate material are mixed together by known procedures, including, but not limited to co-milling. When it is contemplated that the dry mix will note be used immediately, it is preferred to use the coated dihydrate so as to reduce the effects of aging. The dihydrate should be heated so that the coating melts and is caramelized over the surface of the particle. The coated material ages well, demonstrating the same effectiveness when tested nine months later.

In another embodiment, water is added to make a liquid set accelerator slurry. Although the liquid set accelerator slurry is necessary in order to form a sprayable plaster composition that will properly adhere to vertical surfaces, certain properties of the liquid set accelerator must be addressed. Attention must also be paid to the total amount of solids in the set accelerator slurry. If the ratio of solids to water is too high, the mixture will be too thick, making it difficult and expensive to pump. The total solids, comprising calcium sulfate dihydrate, sugar, zinc sulfate and aluminum sulfate, must not exceed 55% by weight of the set accelerator slurry. If the liquid set accelerator slurry is prepared in advance of use, the solids may settle, causing variations in the set time of the accelerated plaster slurry.

Additives that will suspend the solids in the liquid set accelerator slurry may be useful. Biocides may be helpful in reducing microbial growth in the liquid medium. Adjustments to pH may also be helpful. Pigments may also be desirable to indicate how the set accelerator is dispersing in the plaster composition. Inorganic oxide type pigments, or their equivalents are contemplated here.

The set accelerator of the present invention is formed by measuring the dry calcium sulfate dihydrate and zinc sulfate powders and mixing them together. Optionally, if sugar is used with the finely ground calcium sulfate dihydrate, the sugar coating should be applied before the dihydrate is mixed with the other dry components. After the dry components are intimately mixed together, they may be added directly to a plaster slurry or they may be added to water and mixed to form a set accelerator slurry. While water is necessary to make a sprayable solution, it is advantageous to use as little water as possible in preparing the set accelerator slurry. Water in the set accelerator becomes part of the accelerated plaster slurry. Excess water in the plaster slurry makes it easier to pump, but it also diminishes the strength of the hardened calcium sulfate dihydrate product. The amount of water used should be the minimum that is necessary to form a slurry for which pumping is economical.

Prior to contact with the set accelerator, a plaster slurry is formed by mixing a plaster composition with sufficient water to make a workable slurry. It is contemplated that the present set accelerator may be used with any plaster composition known in the art for which rapid setting is desired. It is further contemplated that the present set accelerator is especially suitable for sprayable plaster compositions. The composition must contain calcium sulfate hemihydrate, but may also include additives to improve certain characteristics of the set gypsum. Especially suitable are plasters that dry to a uniform core, uniform thickness and are machinable and dimensionally stable. Fiberglass reinforced compositions may be used, such as those used for decorative panels and columns. The plasters may contain polymeric binders, such as an ethylene-vinyl acetate-vinyl chloride terpolymer for increasing the adhesive strength of the plaster and for preventing the generation of dust during machining. Polyethylene glycol and other polymers may also be used. Particularly suitable plaster compositions of this type are disclosed in commonly assigned, co-pending application entitled "Machinable Plaster Composition" Ser. No. 09/503, 740, filed concurrently herewith which is incorporated by reference herein.

It is also contemplated that the type of plaster compositions which are compatible for use with the present set accelerator include ready mixed setting type joint compounds, of the type disclosed in U.S. Pat. No. 5,746,822, which is herein incorporated by reference. When the latter type of compositions are to be accelerated, it is preferred that the present liquid set accelerator be employed.

The method of contacting the set accelerator with the plaster slurry depends on the application being considered. When used with plaster that does not have a particularly fast set time, the set accelerator can be added and mixed using any conventional technique. If, for example, a decorative panel were made using a mold, the plaster slurry and set accelerator could be poured together in a batch process and quickly poured into the mold. Use of the set accelerator with sprayable plasters requires contacting of the set accelerator with the plaster slurry in a manner which adequately mixes the two solutions, yet accounts for a narrow time frame between mixing and application of the plaster.

Traditional spray guns may not result in sufficient mixing of the set accelerator and plaster slurry for use with the present invention. If the set accelerator forms a cloud through which the plaster slurry droplets pass, the droplets are coated with the set accelerator solution as they pass through the cloud. This may result in the outside of the droplet beginning to set and harden while the inside of the droplet, which has no accelerator, sets at a slower rate. The result is an uneven setting of the plaster slurry on the substrate.

In this case, the preferred method of application is through use of a spray gun with certain characteristics. The preferred spray gun apparatus is disclosed in copending application U.S. Ser. No. 09/505,455 filed concurrently herewith for High Performance Slurry Spray Machine, which is incorporated by reference herein. This apparatus features an applicator or spray gun having two points of atomization by compressed air. The first atomization point introduces compressed air into the plaster slurry to increase its sprayability. A second atomization point is preferably located at the slurry spray outlet of the spray gun, and achieves two goals. First, the plaster slurry is still further atomized, for a more even application. Second, the set accelerator is vaporized and blended with compressed air at the second atomization point to prevent in-gun clogging while providing a more uniform distribution of set accelerator in the sprayed plaster slurry. Specially designed manifolds and outlet nozzles are provided for atomizing the plaster slurry and for mixing the vaporized and atomized set accelerator slurry with the main slurry flow. An open-topped plaster slurry container coupled to a positive displacement pump provides constant feed flow of this type of slurry.

Another feature of the preferred spray apparatus is the inclusion of a dampening device in applications where a pulsating-type pump is employed. The dampener evens out the flow pulses, and is designed to be used with the somewhat abrasive and sometimes relatively viscous plaster slurries. Pneumatically controlled pinch valves are used throughout the apparatus to prevent the clogging through plaster buildup inherent with conventional ball valves.

In the following examples, all percentages are by weight unless expressed to the contrary. References to set time refer to Vicat set time, which is the time during which a 300 gram Vicat needle per ASTM C-472 will freely penetrate of its own weight half-way into the thickness (about 1 inch) of a standard plaster of Paris and water mix in an approximately 6 ounce capacity cup.

EXAMPLES

Set accelerators were tested with a ready mixed setting type joint compound of the type disclosed in U.S. Pat. No. 5,746,822 to determine the effect of set accelerator composition on set times. CSA is a pre-made sugar coated gypsum that is produced at U.S. Gypsum Company's Southard plant. CSA comprises 95% calcium sulfate dihydrate in the form of land plaster and 5% sucrose. The mixture has been intimately mixed and heated to 250° F. to melt and caramelize the sugar.

Amounts of all components were measured as indicated in TABLE I. CSA and zinc sulfate were mixed together, then added to the water. The set accelerator slurry was then added to 200 grams of the joint compound and the Vicat set time was recorded.

TABLE I

| Example | ZnSO4 | CSA | Water | Vicat Set |
|---|---|---|---|---|
| 1 | 5 grams | 5 grams | 10 cc | 27 minutes |
| 2 | 6 grams | 5 grams | 10 cc | 19 minutes |
| 3 | 7.5 grams | 5 grams | 10 cc | 12 minutes |

This example shows the effect of increasing the amount of zinc sulfate on the set time.

TABLE II

| Accelerator(s) | Accelerator Ratio | Accelerator Solution pH | Mixing Notes | Vicat Set Time |
|---|---|---|---|---|
| Alum | 30 g of 50% alum solution/200 g RMSTJC | 1.0 | Frothy Mix | 6 |
| Alum + ZnSO4 | 20 g of 50% alum solution/10 g ZnSO4/10 cc water/200 g RMSTJC | | Frothy, Grainy Mix | 1 |
| ZnSO4 | 25 g ZnSO4/50 cc H2O/200 g RMSTJC | 4.2 | Grainy Mix | 20 |
| Alum + CSA | 10 g of 50% alum solution/5 g CSA/10 cc H2O/200 g RMSTJC | 1.7 | Grainy, Frothy Mix | 7 |
| Alum + CSA | 2 g of 50% alum solution/1 g CSA/5 cc H2O/200 g RMSTJC | 1.7 | Frothy Mix | 17 |
| ZnSO4 + CSA | 6 g ZnSO4/5 g CSA/10 cc H2O/200 g RMSTJC | 4.2 | Smooth Mix | 19 |
| ZnSO4 + CSA | 10 g ZnSO4/5 g CSA/20 cc H2O/200 g RMSTJC | 3.5 | Slightly Grainy Mix | 12 |

Note: Alum refers to aluminum sulfate. CSA refers to Climate Stabilized Accelerator as produced by U.S Gypsum Co. and as described in the specification.
Note: RMSTJC refers to ready mixed setting type joint compound of a type developed from U.S. Pat. No. 5,746,822.

The data in Table II represents an evaluation of various combinations of accelerants used in a ready mixed setting type joint compound. Reviewing the data of Table II from top to bottom, the above data indicates a progression from alum, with undesirably low pH and mixing, but good set times, to zinc sulfate with good solution pH, but grainy mixing, to low levels of alum which give good set times but still with low pH and poor mixing, to zinc sulfate and CSA with good pH, good mixing and good set times. Thus, the combination of zinc sulfate and CSA provided the optimum results of the combinations reviewed.

The data in Table III represents a trial of the effect on the hydration rate of moulding plaster of the various combinations of accelerants. As noted in the Table, 200 g of water were mixed with 200 g of plaster and 3 g accelerant. The mixture was soaked for 7 seconds to allow the plaster to wet out, then was mixed with a high speed Waring blender for 7 seconds. Next, the blended mixture was poured into a cup. A thermocouple was used to collect temperature data every 5 seconds.

TABLE III

| Trial Number | 1 | 2 | 3 | 4 | 5 | 6 |
|---|---|---|---|---|---|---|
| Test Base | | | | | | |
| USG Moulding Plaster Used (g) | 200 | 200 | 200 | 200 | 200 | 200 |
| Water Added (cc) | 200 | 200 | 200 | 200 | 200 | 200 |
| Accelerator (g) | 3 | 3 | 3 | 3 | 3 | 3 |
| Set accelerator Formulation | | | | | | |
| CSA | 20% | 0% | 0% | 26% | 26% | 0% |
| Aluminum Sulfate | 12% | 26% | 52% | 0% | 26% | 0% |
| Zinc Sulfate | 20% | 0% | 0% | 26% | 0% | 0% |
| Water | 48% | 74% | 48% | 48% | 48% | 0% |

TABLE III-continued

| Trial Number | 1 | 2 | 3 | 4 | 5 | 6 |
|---|---|---|---|---|---|---|
| Temperature Rise Set Results | | | | | | |
| Time to 10% Hydration (min.) | 5.92 | 7.67 | 8.25 | 6.00 | 5.75 | 8.33 |
| Time to 50% Hydration (min.) | 11.75 | 15.75 | 16.92 | 11.75 | 12.08 | 31.67 |
| Time to 98% Hydration (min.) | 17.92 | 22.83 | 23.75 | 17.83 | 18.58 | 40.00 |

The data in Table III shows that the best average time is obtained for the accelerant combining zinc sulfate material, CSA and aluminum sulfate material. For spray applied plaster mixtures, the 10% and 50% hydration rate values are most important. While the alum/CSA example had the fastest hydration rate to 10%, it had a pH of 3.3. The zinc sulfate material/CSA/aluminum sulfate material was faster to 50% and 98% hydration with a pH of 3.7, and the zinc sulfate material/CSA combination was also comparable, with a pH of 5.4. Any of these set accelerators which can reduce the percentage of alum, and which will have a more neutral pH, will be more desirable from a production standpoint.

The following examples describe the preferred formulation for the sprayable plaster mixture composition for obtaining machinable plaster compositions in accordance with the invention:

TABLE IV

| Chemical Name | Percent by Weight | Trade name/Vendor |
|---|---|---|
| Calcium sulfate hemihydrate | 89.86–89.90 | Hydrocal☐ C-Base US Gypsum |
| Poly(ethylene glycol) powder | 6.00 | Carbowax 8,000 Union Carbide |
| Ethylene/vinyl acetate | 2.00 | Airflex RP226 Wacker Chemical |
| Methylcellulose | 0.25 | Methocel☐ 225 Dow Chemical |
| Defoamer | 0.16 | Foamaster CN Geo Specialty Chem. |
| Perlite | 1.00 | Noble 200C |
| lime | 0.15 | Mason's Lime AP Green |
| Potassium sulfate | 0.50 | |
| Sodium citrate | 0.10–0.40 | Sodate US Gypsum |

Sprayable Plaster Mixture Tests

The above formulation was alternately tested with each of a saturated set accelerator solution comprising approximately 3 pounds of alum per gallon of water, as well as with a set accelerator solution including 20% zinc sulfate, 20% CSA, 12% aluminum sulfate and 48% water. A volume ratio off set accelerator to plaster slurry of approximately 1:14 was maintained. Contacting of the set accelerator solution with the plaster slurry took place at the exit of the nozzle of a spray gun. Hydration rate was measured by periodically measuring the temperature of the sprayed composition. For testing purposes, the nozzle was removed from the spray gun to facilitate production of a slab of gypsum of a given thickness so that standard tests could be performed. Plaster planks were prepared using the above noted formulation and permitted to cure for one week.

The results of the above tests are graphically indicated in FIG. 1, which indicates that the set accelerator solution accelerated hydration of the plaster mixture as compared to the saturated alum solution.

Strength and Stability-Alum Solution

Dimensional stability of the above-described samples using the alum set accelerator solution was determined by subjecting three specimens, each measuring 24 inches in length, to the following conditions. After each step, the following average changes in length were observed.

| | Environmental Conditions | Ave. Change (inches) |
|---|---|---|
| Step 1. | 24 hours at 77° F. and 50% relative humidity. | –0.002 |
| Step 2. | 24 hours at –20° F. | –0.032 |
| Step 3. | 24 hours at 77° F. and 50% relative humidity | –0.001 |
| Step 4. | 6 hours at 130° F. | 0.015 |
| Step 5. | 24 hours at 77° F. and 50% relative humidity | 0.001 |
| Step 6. | 7 days at 100° F. and 100% relative humidity | 0.013 |
| Step 7. | 24 hours at 77° F. and 50% relative humidity | 0.004 |

Compressive strength determinations were made in accordance with the procedures of ASTM D 695-96. Specimens tested utilizing a crosshead speed of 0.05 inch per minute yielded an average compressive strength of 1,780 psi.

Tensile strength and elongation determinations were made in accordance with the procedures of ASTM D 638-96. Specimens tested utilizing a crosshead speed of 0.2 inches per minute yielded an average tensile strength of 398 psi and average elongation of 0.07 percent.

Flexural strength and tangential flexural modulus determinations were made in accordance with the procedures of ASTM D 790-96. Specimens tested utilizing a crosshead speed of 0.11 inches per minute at a 4 inch span yielded an average flexural strength of 888 psi and average tangential flexural modulus of 925,000 psi.

Unnotched izod impact tests were performed in accordance with the procedures of ASTM D 4812-93. The specimens tested endured an average of 0.257 ft. lbs./in. before a complete break was observed.

Density determinations were made in accordance with the procedures of ASTM D 792-91. An average density of 1.53 g/cm$^3$ was observed for three specimens.

Heat deflection was performed on two specimens, at an outer fiber stress of 264 psi, in accordance with ASTM D 648-96. An average heat deflection of 308° F. was observed.

The average coefficient of linear thermal expansion was determined for two samples in accordance with ASTM D 696-91. The specimens yielded an average coefficient of thermal linear expansion of $1.19 \times 10^{-5}$ in./in./° F.

Thermal analysis by differential scanning calorimetry was performed.

A major melt point of 162° C. and a minor melt point of 192° C. was observed.

Strength and Stability-Set Accelerator Solution

The sprayable plaster composition of Table 3 was also used with the zinc sulfate material/CSA/aluminum sulfate material set accelerator of the present invention. The formulation was contacted with the following set accelerator solution:

| Chemical Name | Percent by Weight | Tradename/Vendor |
|---|---|---|
| Alum | 12 | |
| Zinc Sulfate | 20 | |
| CSA | 20 | USG/Southard |
| Water | 48 | |

A ratio of set accelerator to plaster slurry of 1:14 was maintained. Contacting of the set accelerator solution with the plaster slurry took place in the barrel of a spray gun, however the nozzle was removed from the gun to facilitate production of a slab of gypsum of a given thickness so that standard tests could be performed. The plaster planks were prepared using the above noted formulation and permitted to cure for one week.

Dimensional stability was determined by subjecting three specimens, each measuring 24 inches in length, to the following conditions. After each step, the following average changes in length were observed.

| | Environmental Conditions | Ave. Change (inches) |
|---|---|---|
| Step 1. | 24 hours at 77 ° F. and 50% relative humidity. | −0.002 |
| Step 2. | 24 hours at −20° F. | −0.034 |
| Step 3. | 24 hours at 77° F. and 50% relative humidity | −0.003 |
| Step 4. | 6 hours at 130° F. | 0.010 |
| Step 5. | 24 hours at 77° F. and 50% relative humidity | −0.004 |
| Step 6. | 7 days at 100° F. and 100% relative humidity | 0.010 |
| Step 7. | 24 hours at 77° F. and 50% relative humidity | 0.003 |

Compressive strength determinations were made in accordance with the procedures of ASTM D 695-96. Specimens tested utilizing a crosshead speed of 0.05 inch per minute yielded an average compressive strength of 2,260 psi.

Tensile strength and elongation determinations were made in accordance with the procedures of ASTM D 638-96. Specimens tested utilizing a crosshead speed of 0.2 inches per minute yielded an average tensile strength of 624 psi and average elongation of 0.04 percent.

Flexural strength and tangential flexural modulus determinations were made in accordance with the procedures of ASTM D 790-96. Specimens tested utilizing a crosshead speed of 0.11 inches per minute at a 4-inch span yielded an average flexural strength of 1,240 psi and average tangential flexural modulus of 1,070,000 psi.

Unnotched izod impact tests were performed in accordance with the procedures of ASTM D 4812-93. The specimens tested endured an average of 0.288 ft. lbs./in. before a complete break was observed.

Density determinations were made in accordance with the procedures of ASTM D 792-91. An average density of 1.53 g/cm$^3$ was observed for three specimens.

Heat deflection was performed on two specimens, at an outer fiber stress of 264 psi, in accordance with ASTM D 648-96. An average heat deflection of 317° F. was observed.

The average coefficient of linear thermal expansion was determined for two samples in accordance with ASTM D 696-91. The specimens yielded an average coefficient of thermal linear expansion of $1.19 \times 10^{-5}$ in./in./° F.

Thermal analysis by differential scanning calorimetry was performed. A major melt point of 163° C. and a minor melt point of 188° C. was observed. It will be seen from the above data that the plaster compositions incorporating the zinc sulfate material/CSA/aluminum sulfate material set accelerator had superior strength compared to like plaster compositions incorporating the alum set accelerator.

While a particular embodiment of the set accelerator for the set acceleration of spray applied plaster has been shown and described, it will be appreciated by those skilled in the art that changes and modifications may be made thereto without departing from the invention in its broader aspects and as set forth in the following claims.

What is claimed is:

1. A set accelerator for at least one of accelerating hydration rate and reducing the set time of an aqueous slurry of calcium sulfate hemihydrate comprising a mixture of ground calcium sulfate dihydrate and zinc sulfate material.

2. The set accelerator of claim 1 wherein said set accelerator further comprises aluminum sulfate material.

3. The set accelerator of claim 1 wherein said set accelerator further comprises one or more of starch, sugar, boric acid and combinations thereof.

4. The set accelerator of claim 3 wherein said calcium sulfate dihydrate has said sugar applied as a coating thereover.

5. The set accelerator of claim 4 wherein said sugar is one or more of sucrose and dextrose.

6. The set accelerator of claim 5 wherein said set accelerator further comprises aluminum sulfate material.

7. The set accelerator of claim 1 wherein:
   said calcium sulfate dihydrate is present in an amount of from about 20% to about 80% by weight of the total set accelerator composition;
   an aluminum sulfate material is present in an amount of from about 0% to about 12% by weight of the total set accelerator composition; and
   said zinc sulfate material is present in an amount of from about 20% to about 80% by weight of the total set accelerator composition.

8. A fluid set accelerator suspension for increasing the hydration rate of a slurry of calcium sulfate hemihydrate and water comprising a mixture of ground calcium sulfate dihydrate particles, zinc sulfate material and water.

9. The fluid set accelerator suspension of claim 8 further comprising aluminum sulfate material.

10. The fluid set accelerator suspension of claim 9 further comprising one or more of starch, sugar and boric acid.

11. The fluid set accelerator suspension of claim 10 wherein said sugar comprises one or more of sucrose or dextrose.

12. The fluid set accelerator suspension of claim 11 wherein said sugar comprises a coating on said calcium sulfate dihydrate.

13. The fluid set accelerator suspension of claim 12 wherein said water comprises from about 45% to about 90% of the liquid set accelerator by weight.

14. The fluid set accelerator suspension of claim 13 further comprising one or more of a biocide, a suspending agent, a pigment and a pH adjuster.

15. The fluid set accelerator suspension of claim 8 wherein:
   said calcium sulfate dihydrate is present in an amount of from about 5 to about 45% by weight of the total set accelerator composition;
   an aluminum sulfate material is present in an amount of from about 0% to about 6.6% by weight of the total set accelerator composition;

said zinc sulfate material is present in an amount of from about 5% to about 45% by weight of the total set accelerator composition; and said water is present in amount of from about 45% to about 90% by weight of the total set accelerator composition.

16. A method of preparing a gypsum containing composition, comprising:

providing calcined calcium sulfate hemihydrate;

mixing said calcium sulfate hemihydrate with a sufficient supply of water to form a hydratable slurry having a hydration rate;

introducing into said slurry a set accelerator for accelerating the hydration rate of said slurry, said set accelerator including a blend of effective proportions of ground calcium sulfate dihydrate and zinc sulfate; and allowing said calcium sulfate hemidydrate to hydrate to form gypsum.

17. The method of claim 16 wherein said calcium sulfate dihydrate is present in an amount of from about 5 to about 45% by weight of the total set accelerator;

said zinc sulfate material is present in an amount of from about 5% to about 45% by weight of the total set accelerator; and said water is present in amount of from about 45% to about 90% by weight of the total set accelerator composition.

18. The method of claim 16 further wherein said set accelerator further comprises an effective amount of aluminum sulfate material.

19. The method of claim 16 wherein an aluminum sulfate material is present in an amount of from about to about 6.6% by weight of the total set accelerator composition.

20. The method of claim 16 further comprising spraying said slurry through a spray apparatus, and introducing said set accelerator into said slurry during said spraying operation.

21. The method of claim 20 further comprising spraying said set accelerator through a spray gun contemporaneously with a plaster slurry, the spray gun having a nozzle, such that said set accelerator and the plaster slurry are mixed at the exit of the nozzle of the spray gun.

* * * * *